United States Patent
Kamal et al.

(10) Patent No.: US 11,157,905 B2
(45) Date of Patent: Oct. 26, 2021

(54) SECURE ON DEVICE CARDHOLDER AUTHENTICATION USING BIOMETRIC DATA

(71) Applicant: MasterCard International Incorporated, Purchase, NY (US)

(72) Inventors: Ashfaq Kamal, White Plains, NY (US); Bob Reany, Stamford, CT (US); Gregory D. Williamson, Stamford, CT (US)

(73) Assignee: Mastercard International Incorporated, Purchase, NY (US)

( * ) Notice: Subject to any disclaimer, the term of this patent is extended or adjusted under 35 U.S.C. 154(b) by 1825 days.

(21) Appl. No.: 14/839,234

(22) Filed: Aug. 28, 2015

(65) Prior Publication Data

US 2017/0061441 A1 Mar. 2, 2017

(51) Int. Cl.
*G06Q 20/40* (2012.01)
*G06Q 20/32* (2012.01)

(52) U.S. Cl.
CPC ....... *G06Q 20/40145* (2013.01); *G06Q 20/32* (2013.01); *G06Q 2220/00* (2013.01)

(58) Field of Classification Search
CPC .................. G06Q 20/401; G06Q 20/40145
See application file for complete search history.

(56) References Cited

U.S. PATENT DOCUMENTS

| | | | | |
|---|---|---|---|---|
| 1,175,749 | A | * | 3/1916 | Gunthorpe ............. H02G 13/00 174/2 |
| 3,489,513 | A | * | 1/1970 | Ferris ...................... C22B 26/22 423/166 |
| 8,489,513 | B2 | * | 7/2013 | Bishop ................. G06Q 20/027 705/66 |

(Continued)

FOREIGN PATENT DOCUMENTS

EP            1175749 A1       1/2002

OTHER PUBLICATIONS

S. Gupta and R. Johari, "A New Framework for Credit Card Transactions Involving Mutual Authentication between Cardholder and Merchant," 2011 International Conference on Communication Systems and Network Technologies, 2011, pp. 22-26, doi: 10.1109/CSNT.2011.12. (Year: 2011).*

(Continued)

*Primary Examiner* — Neha Patel
*Assistant Examiner* — Jahed Ali
(74) *Attorney, Agent, or Firm* — Buckley, Maschoff & Talwalkar LLC (57) ABSTRACT

A secure on-device cardholder authentication method and system. In an embodiment, a consumer's mobile device uses a mobile application to receive a user authentication request from an entity. A biometric data capture request is then transmitted to a biometric sensor of the mobile device, and a determination made that the mobile application is authorized to use an authenticator API. Next, the mobile device processor prompts the user to provide at least one form of (Continued)

biometric data in accordance with business rules, receives a user authentication response when the user provided biometric data matches locally stored biometric data, generates a positive user authentication response message, and transmits the positive user authentication response message to the entity.

13 Claims, 6 Drawing Sheets

(56) References Cited

U.S. PATENT DOCUMENTS

| | | | | |
|---|---|---|---|---|
| 9,160,726 B1* | 10/2015 | Kaufman | | H04L 63/08 |
| 9,342,681 B2* | 5/2016 | Cotterill | | G06F 21/35 |
| 9,374,369 B2* | 6/2016 | Mahaffey | | H04L 63/083 |
| 9,451,458 B2* | 9/2016 | Cotterill | | G06F 21/35 |
| 9,602,463 B2* | 3/2017 | Wu | | H04L 61/2015 |
| 9,686,245 B2* | 6/2017 | Brand | | H04L 63/0428 |
| 9,843,444 B2* | 12/2017 | Goto | | H04L 9/0844 |
| 10,054,361 B2* | 8/2018 | Kim | | A47L 15/4293 |
| 10,178,234 B2* | 1/2019 | Coffman | | H04M 3/42263 |
| 10,218,697 B2* | 2/2019 | Cockerill | | H04L 63/0853 |
| 10,432,620 B2* | 10/2019 | Smets | | H04L 63/0861 |
| 11,036,870 B2* | 6/2021 | Kamal | | G06F 9/54 |
| 2002/0174348 A1* | 11/2002 | Ting | | G06F 21/32 713/186 |
| 2005/0124323 A1* | 6/2005 | Ichihara | | H04M 1/274516 455/412.1 |
| 2005/0187883 A1* | 8/2005 | Bishop | | G06Q 20/027 705/67 |
| 2008/0016347 A1* | 1/2008 | Maj | | G06F 21/34 713/168 |
| 2010/0058064 A1* | 3/2010 | Kirovski | | H04L 9/3073 713/176 |
| 2011/0087690 A1* | 4/2011 | Cairns | | G06F 21/6218 707/769 |
| 2012/0023153 A1* | 1/2012 | Karasaridis | | H04L 61/1511 709/203 |
| 2012/0108208 A1* | 5/2012 | Willis | | H04L 63/0853 455/411 |
| 2012/0159598 A1* | 6/2012 | Kim | | G06F 21/31 726/7 |
| 2013/0055372 A1* | 2/2013 | Chao | | G06F 21/31 726/7 |
| 2013/0104197 A1* | 4/2013 | Nandakumar | | G06F 21/36 726/4 |
| 2013/0198086 A1* | 8/2013 | Mardikar | | G06Q 20/4012 705/71 |
| 2014/0164254 A1* | 6/2014 | Dimmick | | G06Q 20/4012 705/71 |
| 2014/0181925 A1* | 6/2014 | Smith | | G06F 21/45 726/6 |
| 2014/0189808 A1* | 7/2014 | Mahaffey | | H04L 63/083 726/4 |
| 2015/0244718 A1* | 8/2015 | Smets | | G06F 21/74 726/7 |
| 2017/0061441 A1* | 3/2017 | Kamal | | G06Q 20/40145 |
| 2018/0018477 A1* | 1/2018 | An | | G06F 21/32 |

OTHER PUBLICATIONS

F. L. Podio, "Personal authentication through biometric technologies," Proceedings 2002 IEEE 4th International Workshop on Networked Appliances (Cat. No.02EX525), 2002, pp. 57-66, doi: 10.1109/IWNA.2001.980804. (Year: 2002).*
Sogukpinar et al., "Multi-level Authentication Scheme Utilitzing Smart Cards and Biometrics", 2009, Third International Conference on, IEEE, Pistacaway, NJ, 6 pp.
Wang, Dongwang et al.,"How Global Platforms TEE is Solving the Missing Security Link for Mobile Wallets", Mar. 20, 2014, 14 pp.
Extended European Search Report dated Feb. 2, 2018 from corresponding Application No. 15835740, 11 pp.
International Search Report and Written Opinion dated Dec. 7, 2015 from corresponding Application No. PCT/US15/47492, 8 pages.

* cited by examiner

SECURE ON DEVICE CARDHOLDER AUTHENTICATION USING BIOMETRIC DATA

CROSS REFERENCE TO RELATED APPLICATION

This application claims the benefit of U.S. Provisional Patent Application No. 62/043,818 filed on Aug. 29, 2014, the contents of which are hereby incorporated by reference for all purposes.

FIELD OF THE INVENTION

Embodiments generally relate to secure cardholder authentication processes using biometric data. In particular, embodiments relate to using a consumer mobile device to capture biometric data from a user and to compare the captured data to biometric templates stored locally on the consumer mobile device in accordance with secure, multi-factor authentication techniques to authenticate a cardholder.

BACKGROUND

More and more transactions involve a user operating a mobile device. A common example of a transaction is a payment transaction (or purchase transaction), although a large number of other types of transactions benefit from the improved authentication techniques described herein. For convenience, payment transactions will be described, however, those skilled in the art, upon reading this disclosure, will appreciate that other types of transactions may be used with the authentication techniques described herein. In many types of transactions, it is increasingly important that the user involved in such transactions be authenticated. Often, the user is authenticated using a personal identification number ("PIN") or the like. However, it is becoming increasingly important to provide additional authentication layers (referred to herein as "multi-factor" authentication) for improved security and authentication.

Card issuers and other financial institutions now offer or use standardized Internet transaction protocols to improve on-line transaction performance, security and to accelerate the growth of electronic commerce. Under some standardized protocols payment card issuers or issuer financial institutions (FIs), such as issuing banks, may authenticate transactions thereby reducing the likelihood of fraud and associated chargebacks attributed to cardholder not-authorized transactions. One example of such a standardized protocol is the 3-D Secure Protocol. The presence of an authenticated transaction may result in an issuer bank assuming liability for fraud should it occur despite efforts to authenticate the cardholder during an online purchase. Merchants are assured by card issuers or issuing financial institutions (FIs), such as issuer banks, that they will be paid for all issuer-authenticated transactions. The 3-D Secure protocol is consistent with and underlies the authentication programs offered by many card issuers (e.g., Verified by Visa or MasterCard SecureCode) to authenticate customers for merchants during remote transactions such as those associated with the Internet.

The 3-D Secure Protocol leverages existing Secure Sockets layer (SSL) encryption functionality and provides enhanced security through issuer authentication of the cardholder during an online shopping session. It would be desirable to provide secure multi-factor authentication processes to authenticate a user that utilizes a consumer device, wherein the consumer device is used to capture biometric data from the user and securely compare the captured biometric data to stored biometric templates to authenticate the user.

BRIEF DESCRIPTION OF THE DRAWINGS

Features and advantages of some embodiments, and the manner in which the same are accomplished, will become more readily apparent with reference to the following detailed description taken in conjunction with the accompanying drawings, which illustrate exemplary embodiments, wherein.

DETAILED DESCRIPTION

In general, and for the purpose of introducing concepts of novel embodiments described herein, provided are systems, apparatus and methods for performing a secure user authentication process utilizing a consumer mobile device, such as a Smartphone, to authenticate a cardholder during a transaction such as a financial transaction.

A number of terms will be used herein. The use of such terms are not intended to be limiting, but rather are used for convenience and ease of exposition. For example, as used herein, the term "cardholder" may be used interchangeably with the term "consumer" and/or the with the term "user" and these terms are used herein to refer to a consumer, person, individual, business or other entity that owns (or is authorized to use) a financial account such as a payment card account (such as a credit card account) or some other type of account (such as a loyalty card account or mass transit access account). In addition, the term "payment card account" may include a credit card account, a debit card account, and/or a deposit account or other type of financial account that an account holder or cardholder may access. The term "payment card account number" includes a number that identifies a payment card system account or a number carried by a payment card, and/or a number that is used to route a transaction in a payment system that handles debit card and/or credit card transactions and the like. Moreover, as used herein the terms "payment card system" and/or "payment network" refer to a system and/or network for processing and/or handling purchase transactions and related transactions, which may be operated by a payment card system operator such as MasterCard International Incorporated, or a similar system. In some embodiments, the term "payment card system" may be limited to systems in which member financial institutions (such as banks) issue payment card accounts to individuals, businesses and/or other entities or organizations. In addition, the terms "payment system transaction data" and/or "payment network transaction data" or "payment card transaction data" or "payment card network transaction data" refer to transaction data associated with payment or purchase transactions that have been processed over a payment network or payment system. For example, payment system transaction data may include a number of data records associated with individual payment transactions (or purchase transactions) of cardholders that have been processed over a payment card system or payment card network. In some embodiments, payment system transaction data may include information that identifies a cardholder, a cardholder's payment device or payment account, a transaction date and time, a transaction amount, merchandise or services that have been purchased, and information identifying a merchant and/or a merchant category. Additional transaction details may also be available in some embodiments.

In some embodiments, improved cardholder authentication techniques and methods are disclosed which provide an improved user experience for merchants and for users or consumers or cardholders using consumer devices. For example, a secure cardholder authentication process includes a consumer mobile device receiving a request to authenticate a user from an entity in conjunction with a transaction. The consumer mobile device then may determine at least one authentication criteria based on a policy associated with the entity. In some implementations, the consumer mobile device next captures user or cardholder biometric data using one or more biometric sensors of the mobile device, compares the captured biometric data to locally stored biometric data in accordance with the authentication criteria, and then transmits a positive cardholder authentication response to the entity when the captured biometric data of the user matches the locally stored biometric data in accordance with the authentication criteria. The locally stored biometric data can be stored, for example, in a storage element of a biometric sensor(s), in a biometric storage element separate from the biometric sensor(s) (for example, the secure biometric storage element may be memory device residing in a rich execution environment), or in an secure biometric storage element separate from the biometric sensor(s) (for example, the secure biometric storage element may be memory device residing in a trusted execution environment).

In some implementations, the authentication techniques described herein may include additional cardholder authentication levels. The additional cardholder authentication levels may be determined and/or required by, for example, a card issuer financial institution, and may be applied on a transaction by transaction basis. Such functionality allows the cardholder authentication level required for any given transaction of a plurality of transactions to be enhanced in some situations. Embodiments described herein provide improved adoption of such cardholder authentication techniques and/or levels, as well as advantageously reducing the number of declined transactions which are in fact legitimate card not present transactions (resulting in an improved cardholder transaction experience while also benefiting merchants and issuer financial institutions).

Pursuant to some embodiments, a user's or cardholder's mobile device or consumer mobile device (such as a Smartphone, tablet computer, laptop computer, personal digital assistant (PDA), digital music player, or the like) can be used to leverage additional factors for authentication in online transactions. Embodiments utilize secure authentication technology resident on the consumer mobile device to deliver an optimal user experience and to provide layered authentication factors. For example, authentication technologies such as finger print biometrics, facial recognition biometrics, voice biometrics, and/or other types of biometrics may be utilized with the consumer mobile device configurations described herein. Embodiments utilize the consumer mobile device configurations (which will be described further herein) to allow an identification of the appropriate cardholder authentication process(es) to be used for a particular transaction for a given user or cardholder.

The consumer mobile device may be used in conjunction with a number of different types of transaction processes to provide the appropriate user or cardholder authentication. In addition, different types of cardholder verification methods (CVMs) can be performed locally by the consumer mobile device to authenticate a user, wherein any particular CVM may depend on criteria specified by any of a plurality of entities. For example, a CVM that requires entering a mobile personal identification number (mPIN) and providing a fingerprint may be required my Merchant 1 to authenticate the user for a particular transaction, whereas for a similar transaction Merchant 2 may require a CVM that requires the user to provide an iris scan and facial data (from a photograph of the user). In accordance with processes described herein, the consumer's mobile device is equipped to handle such diverse or different CVM requirements by having the user utilize one or more biometric sensors of the consumer mobile device to provide the required user biometric data, and have that compared to locally stored user authentication data.

Throughout this disclosure, an example of a financial transaction will be described. However, those skilled in the art will appreciate that embodiments may be used with desirable results for other types of transactions, such as transactions permitting a cardholder access to a building and/or transactions which allow cardholders to enter a mass transit system station, such as a subway station or public bus transit station.

Reference will now be made in detail to various novel embodiments and/or implementations, examples of which are illustrated in the accompanying drawings. It should be understood that the drawings and descriptions thereof are not intended to limit the invention to any particular embodiment(s). On the contrary, the descriptions provided herein are intended to cover alternatives, modifications, and equivalents thereof. In the following description, numerous specific details are set forth in order to provide a thorough understanding of the various embodiments, but some or all of these embodiments may be practiced without some or all of the specific details. In other instances, well-known process operations have not been described in detail in order not to unnecessarily obscure novel aspects.

Figure 1A:
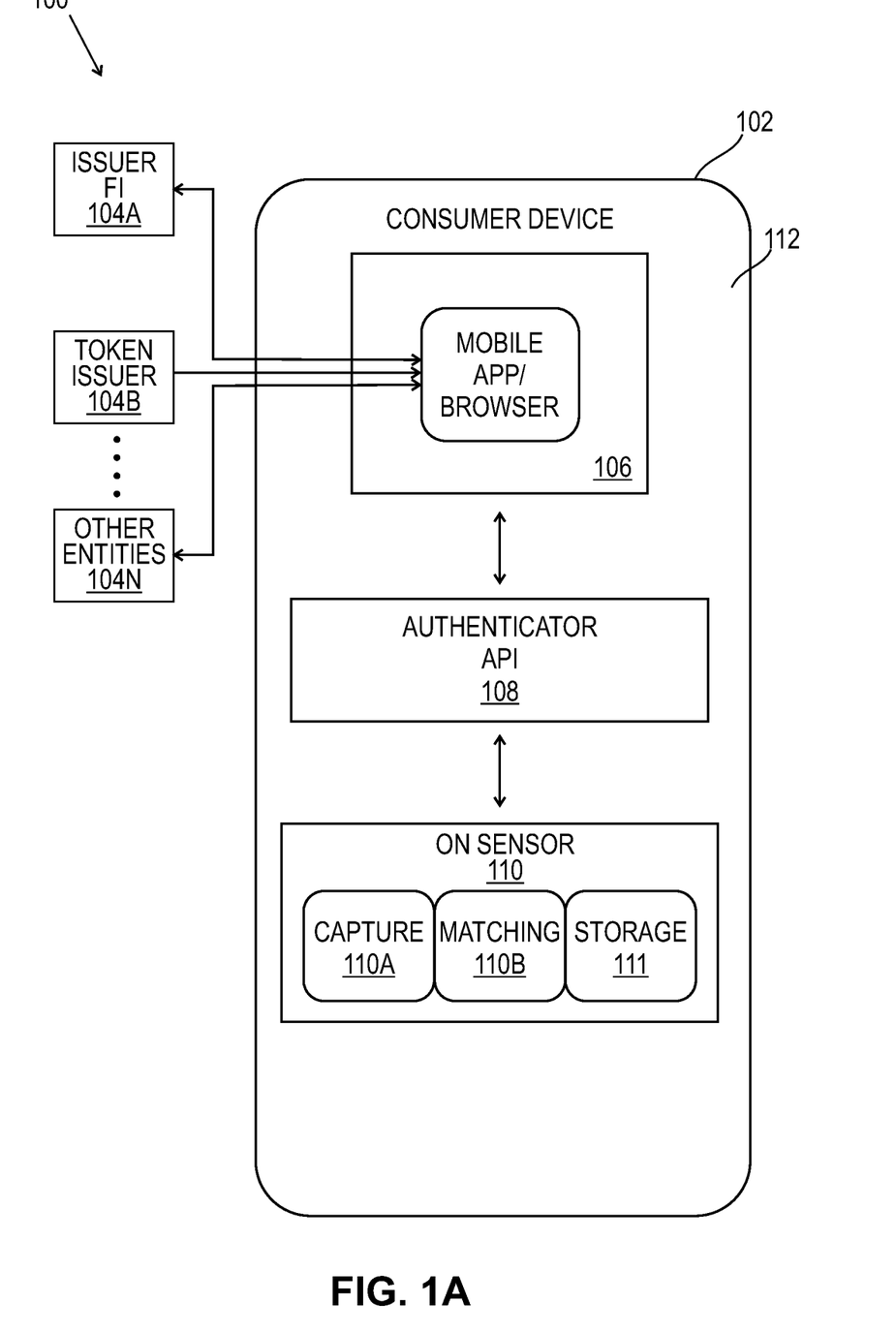
FIG. 1A is a block diagram of a portion of a transaction system for performing a secure user authentication process with a consumer mobile device in accordance with some embodiments of the disclosure.

FIG. 1A is a block diagram of a portion of a transaction system 100 that may be utilized to perform a secure user or cardholder authentication process according to some embodiments. It should be understood that a system pursuant to some embodiments involves a number of devices and/or components and/or entities which interact to conduct a user authentication process as part of a transaction, such as a payment transaction. For example, a user or cardholder may operate a consumer mobile device 102 to interact with an issuer financial institution (FI) computer, which may be an issuer access control system (issuer ACS) server computer, to conduct a user authentication process as disclosed herein. Thus, while only a single consumer mobile device is shown in FIG. 1A along with one access issuer FI 104A, token issuer computer 104B, and an "Other" entities 104N (each of which may be an ACS computer associated with a different entity or organization), in practice a large number of such consumer mobile devices and/or other components and/or devices (which may include a computer network including, for example, a plurality of interconnected server computers) may be involved in such a transaction system in accordance with this disclosure. The Other entities 104N may include, but are not limited to, financial services providers such as Apple Inc., Google Inc., and Amazon.com, Inc. which may provide, for example, online or remote payment services to consumers and/or merchants.

As shown in FIG. 1A, the consumer mobile device 102 has a number of logical and/or functional components (in addition to the normal components typically found in a mobile device, such as an antenna, mobile device microprocessor(s), one or more memory devices and the like, which will be explained below). As shown, some of the components include a mobile application and/or browser 106, which may be provided by a payment network provider such as MasterCard International Incorporated, an authenticator application programming interface (API) 108, and at least one sensor 110. In the embodiment shown in FIG. 1A, each of these components (mobile application/browser 106, authenticator API 108, and sensor 110) is configured to function in a rich execution environment (REE) 112. The REE 112 is a "normal" processing environment where the device operating system and other applications run. The sensor 110 represents one or more biometric sensors such as a fingerprint sensor and/or a microphone and/or a camera, and each such sensor is configured to securely handle and/or manage biometric data capture, biometric data storage, and biometric data matching. In particular, the biometric sensor(s) 110 operate to capture biometric sample data from a user with a biometric capture application 110A, and then utilize a biometric matching application 110B to attempt to match the biometric sample taken from the user to one or more biometric templates that have been stored locally in a storage component 111. In particular, in the embodiment of FIG. 1A, the biometric template(s) are securely stored within the biometric sensor 110 itself, in the secure memory component 111 of the sensor, as shown.

Figure 1B:
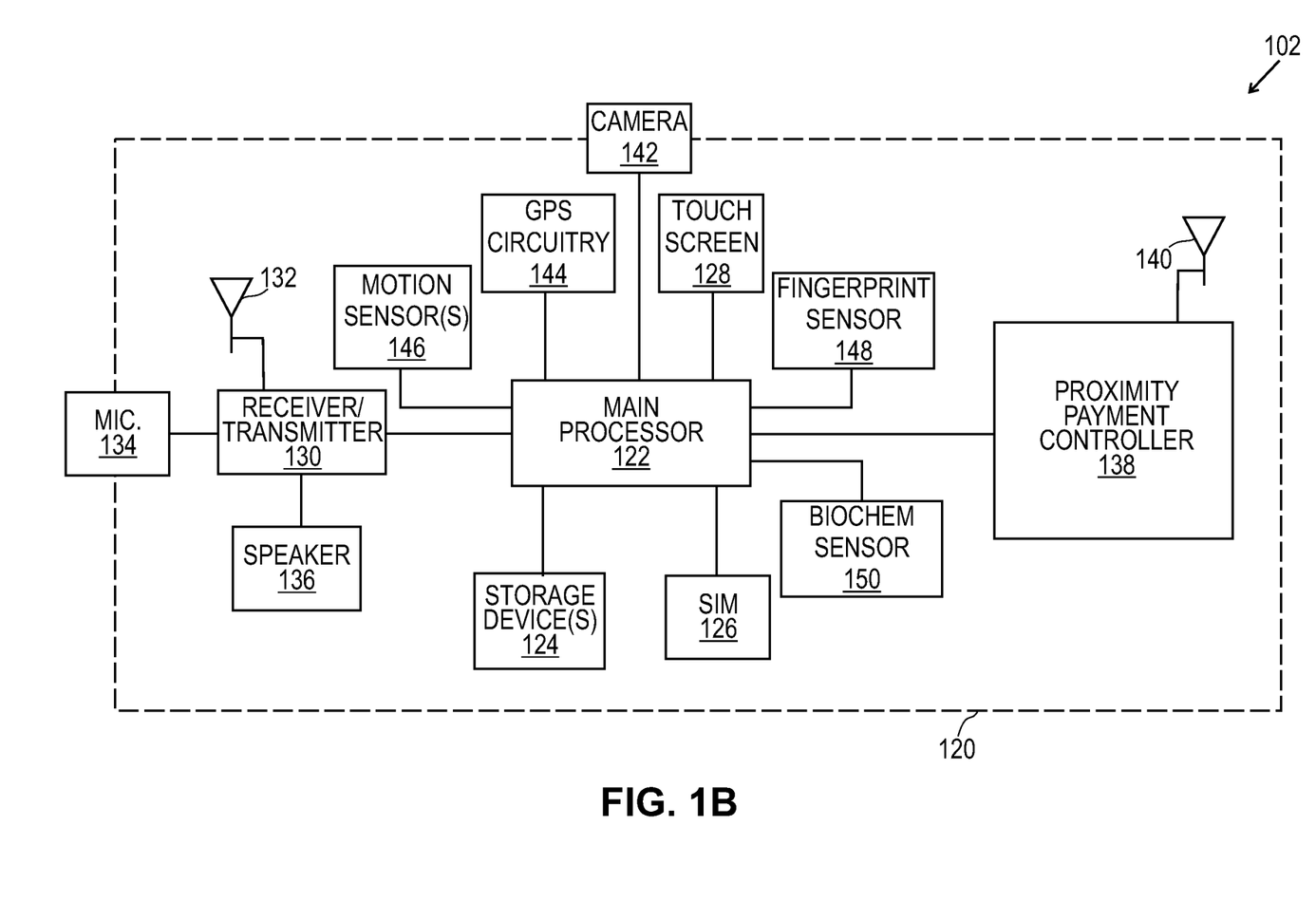
FIG. 1B is a block diagram of an embodiment of a consumer mobile device illustrating hardware aspects that may be utilized during user authentication processing in accordance with some embodiments of the disclosure.

FIG. 1B is a block diagram of an embodiment of a user's mobile device 102 to illustrate some hardware aspects of the device that may be utilized during secure user authentication processing in accordance with embodiments described herein. In this example, the user's mobile device is a mobile telephone 102 that may (but need not) have capabilities for functioning as a contactless payment device. In particular, the user's mobile device 102 may be a payment-enabled mobile device capable of initiating payment transactions in a payment card system. In its hardware aspects the mobile telephone 102 may utilize conventional components, and some of its software components or aspects may also be conventional, but may be configured to provide novel functionality as described herein. In some other embodiments, however, novel functionality as described herein may result at least partially from novel software and/or firmware that programs or instructs one or more mobile device processors of the mobile telephone 102.

The mobile telephone 102 may include a conventional housing (indicated by dashed line 120) that contains and/or supports the other components of the mobile telephone. The mobile telephone 102 includes a main processor 122 for controlling over-all operation, for example, it may be suitably programmed to allow the mobile telephone 102 to engage in data communications and/or text messaging with other wireless devices and/or electronic devices, and to allow for interaction with web pages accessed via browser software over the Internet, which is not separately shown. Other components of the mobile telephone 102, which are in communication with and/or are controlled by the control circuitry 122, include one or more storage devices 124 (for example, program memory devices and/or working memory and/or secure storage devices, and the like), a conventional subscriber identification module (SIM) card 126, and a touch screen display 128 for displaying information and/or for receiving user input.

The mobile telephone 102 also includes conventional receive/transmit circuitry 130 that is also in communication with and/or controlled by the main processor 122. The receive/transmit circuitry 130 is operably coupled to an antenna 132 and provides the communication channel(s) by which the mobile telephone communicates via a mobile network (not shown). The mobile telephone 102 further includes a conventional microphone 134 operably coupled to the receive/transmit circuitry 130, which the microphone 134 is operable to receive voice input from the user. In addition, a loudspeaker 136 is also operably coupled to the receive/transmit circuitry 130 and provides sound output to the user.

The mobile telephone 102 may also include a proximity payment controller 138 which may be an integrated circuit (IC) or chipset of the type commonly embedded in contactless payment cards. The proximity payment controller 138 is operably connected to an antenna 140 and may function to interact with a Radio Frequency Identification (RFID) and/or Near Field Communication (NFC) proximity reader (not shown), which may be associated, for example, with a Point-of-Sale (POS) terminal of a merchant. For example, the proximity payment controller 138 may provide information, such as a user's payment card account number, when the consumer uses the mobile telephone 102 to conduct a purchase transaction with a POS terminal associated with a merchant.

The mobile telephone 102 may include one or more sensors and/or circuitry that functions to provide and/or obtain authentication data concerning the mobile telephone and/or the user. In particular, the mobile telephone 102 may be a Smartphone that includes an integrated camera 142 operably connected to the main processor 122 and that can be utilized for various functions. For example, the integrated camera 142 can take pictures, can be operated to read a two-dimensional (2D) barcode to obtain information, and/or can be operated during an authentication process to take a picture of the user's face and/or of other relevant items. The mobile telephone 102 may also include Global Positioning System (GPS) circuitry 144 operably connected to the main processor 122, and operable to generate information concerning the location of the mobile telephone.

The mobile telephone 102 may also include one or more motion sensor(s) 146, a fingerprint sensor 148, and/or a biochemical sensor 150. The motion sensor(s) 146 may be operable to generate motion data, for example, that can be utilized by the main processor 122 to authenticate a user by, for example, identifying the user's walking style or gait. In another example, the motion sensor(s) 146 may operate to generate force data associated with, for example, the force generated by the user's finger when he or she touches the touch screen 128. The fingerprint sensor 148 may include a touch pad or other component (not shown) for use by the user to touch or swipe his or her index finger when fingerprint data is required to authenticate the user in order to conduct a transaction (such as provide entry to a building). The biochemical sensor 150 may include one or more components and/or sensors operable to obtain user biological data, such as breath data from the user, and/or other types of biological data which may be associated with the user of the mobile device 120. The data obtained by the motion sensor(s) 146, fingerprint sensor 148 and/or biochemical sensor 150, may be compared to biometric data and/or information of the user stored, for example, in one or more of the local storage device(s) 124 in order to authenticate the user of the mobile telephone 102. In addition, in some embodiments, the main processor 122 and receiver/transmitter circuitry 130 may be operable to transmit the results of the cardholder or user authentication process (whether or not a match occurred) to an issuer ACS 104A (See FIG. 1A) for further processing. The main processor 122 and receiver/transmitter circuitry 130 may also be operable to transmit generated GPS data to an issuer ACS regarding the current location of the mobile device. The user's mobile device may also contain one or more other types of sensors, such as an iris scanner device (not shown) for generating iris scan data of a user's eye, which may be useful for identifying biometric or other personal data of the mobile device user.

In some embodiments, a consumer or user or cardholder may be required to participate in a consumer mobile device registration and user authentication enrollment process before user authentication processing in accordance with methods described herein can occur. In some implementations, such a registration process may include a user or consumer or cardholder operating his or her consumer mobile device to interact with one or more payment processing systems or networks (not shown). For example, in a payment processing network example, a cardholder may register information associated with a financial institution associated with the user's or cardholder's payment account (such as a credit card issuer bank which issued a credit card account and/or a debit card account to the user or consumer).

In an illustrative mobile device registration and biometric enrollment process, a first transaction step may include the cardholder directing his or her mobile device to transmit a registration or enrollment request message to a payment processing system computer (not shown) to initiate a registration process. The user or cardholder may create such an enrollment request message to register the consumer mobile device 102 by interacting with the mobile application 106 on the mobile device. The registration request message may be transmitted via a communications network, such as the Internet, to a FIDO server (or other type of server computer) of a payment processing network to initiate the registration of the consumer mobile device and/or user. The payment processing network server may then generate and transmit a consumer registration request challenge message to the consumer's mobile device prompting the user to provide biometric data for use in authentication of that user. For example, if the consumer's mobile device includes a fingerprint sensor, such as a fingerprint reader component, then the user may be prompted to place his or her thumb or index finger on the fingerprint reader to capture that type of biometric data. The captured fingerprint data would then be locally stored, for example, in a secure storage area of the consumer's mobile device. In accordance with methods and embodiments described herein and further explained below, in some implementations such fingerprint data is locally stored by the sensor itself, and/or stored in a secure storage device of the consumer mobile device, and/or is encrypted and stored in a storage element of the consumer device. Thus, in some embodiments, in addition to being stored in a secure storage device and/or by the sensor itself, biometric data may also be encrypted for security purposes.

In some embodiments, the user enrollment process may be followed by a user or cardholder to register a number of biometric data items, which may depend on the available components and/or capabilities of the consumer mobile device. Users may also be permitted to register a number or plurality of consumer mobile devices. Moreover, once the user has registered a consumer mobile device and a biometric dataset, that user registration data may be used to authenticate the user in association with a plurality of different types of transactions, wherein any particular transaction may involve or require a user authentication method that is different from that required by another type of transaction. As part of the user enrollment process, the user may transmit a consumer device identifier (ID) and/or a mobile directory number ("MDN") from the consumer mobile device to an entity, such as a payment processing network server or issuer financial institution. In the system configuration shown in FIG. 1A, the biometric data (which may include, for example, one or more of user fingerprint biometric data, a voice print, facial data, and other data such as pulse data or the like), the device ID, and the MDN are stored on or by the sensor itself so that this data may be retrieved and utilized by the user's mobile device as needed when performing user authentication processing.

Referring again to FIG. 1A, during a transaction wherein user authentication is required, the issuer financial institution (FI) 104A, for example, may transmit a request to the mobile application 106 to perform an on-behalf-of (OBO) biometric user authentication process. (It should be understood that another platform, or another trusted calling party like an issuer ACS, may make such a user authentication request.) The OBO biometric authentication process may be predetermined or pre-arranged by an entity, such as a payment processing network, and advantageously enhances and/or speeds up transaction processing because the user authentication processing is handled by the consumer's mobile device instead of requiring authentication data to be transmitted and verified by, for example, a remote server computer operated by an issuer financial institution. After receiving the OBO authentication request, the mobile device application/browser 106 transmits a request to one or more sensors 110 for biometric data capture via the exposed authenticator API 108. The authenticator API 108 then implements an access control mechanism (not shown) which checks that the mobile application 106 is authorized to use the authenticator API 108. In some implementations, the authenticator API 108 is also an Abstraction layer abstracting calling parties from the low level hardware features of the biometric sensor(s) making the development and interaction seamless.

Referring again to FIG. 1A, if the mobile application/browser 106 is authorized, the user is then prompted (for example, by a message displayed on a display screen of the consumer's Smartphone) to provide one or more forms of biometric data by using the sensor(s) 110 found on the consumer's mobile device 102. For example, predetermined business rules concerning user authentication for a purchase exceeding one hundred dollars ($100) may require a consumer to provide two forms of biometric data (for example, a fingerprint and a voice print). In this case, a fingerprint sensor and a microphone each captures, performs a matching process, and then stores the biometric data itself. If a match occurs for the captured user biometric data (both the fingerprint data and the voice print data) and the biometric template(s) (which have been generated and stored on the sensor(s) during user authentication enrollment and device registration) then an authentication response is transmitted back to the mobile application/browser 106 via the authenticator API 108 for forwarding to the issuer FI 104A (or to another trusted calling party which made the authentication request, such as the Token issuer 104B). In this manner, a secure, multi-factor authentication techniques can be utilized depending on the context and/or attributes of a particular transaction.

Figure 2:
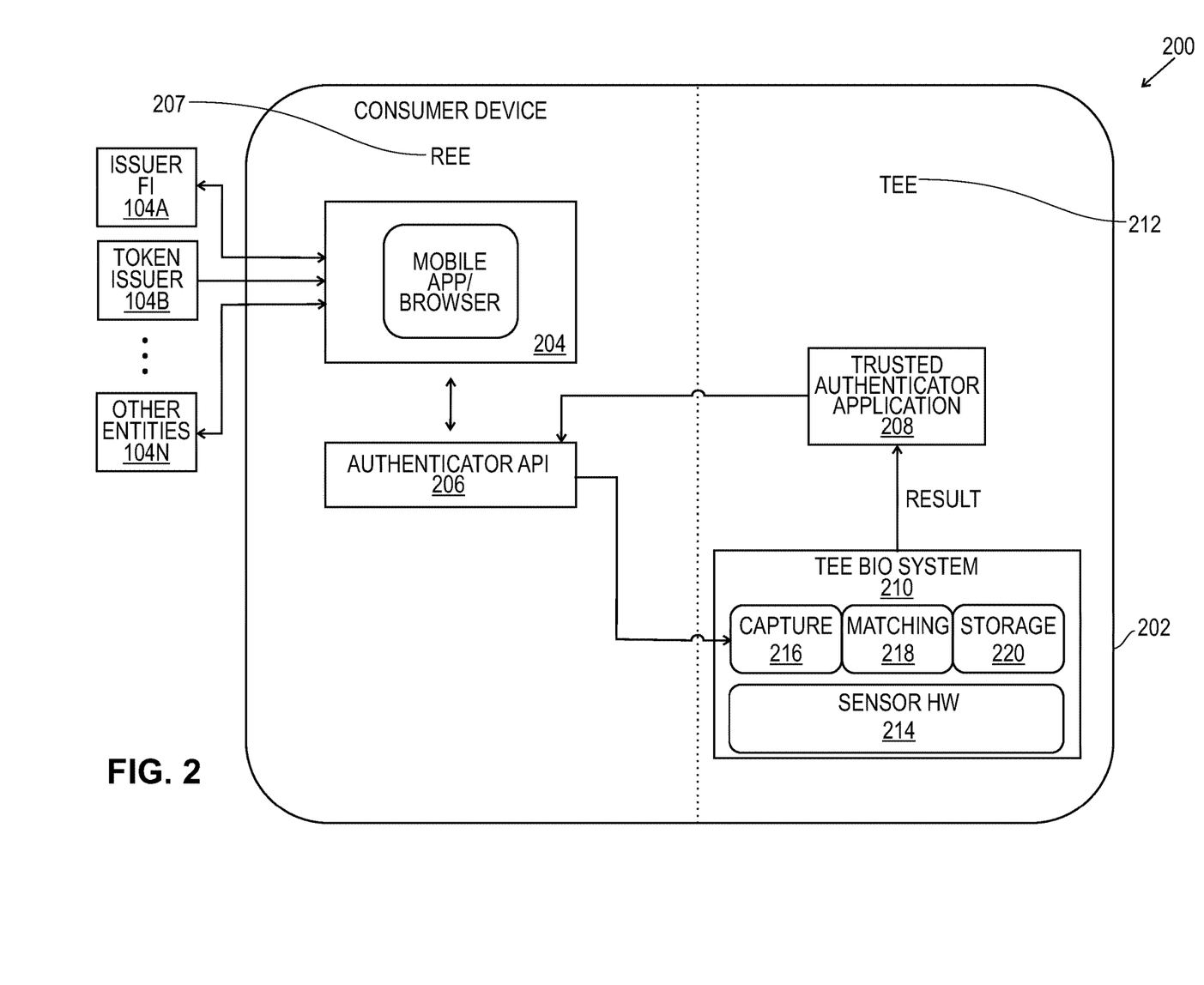
FIG. 2 is a block diagram of a portion of a transaction system for performing a secure user authentication process with a consumer mobile device according to another embodiment of the disclosure.

FIG. 2 is a block diagram of a portion of a transaction system 200 for performing a secure user authentication process with a consumer device 202 according to a second embodiment. As mentioned above, it should be understood that a system pursuant to the described embodiments involves a number of devices and/or components and/or entities which interact to conduct a user authentication process as part of a transaction, such as a payment transaction. For example, a user or consumer may operate a consumer mobile device 202 to interact with an issuer financial institution (FI) computer 104A, which may be an issuer access control system (issuer ACS) computer, to conduct a user authentication process as disclosed herein. Thus, while only a single consumer mobile device is shown in FIG. 2 along with a single issuer FI 104A, token issuer 104B, and an Other Entities 104N (each of which may be associated with a different entity or organization), in practice a large number of such consumer devices and issuer FIs and/or access control system server computers and/or other devices may be involved in a system in accordance with this disclosure.

Referring to FIG. 2, the consumer device 202 includes a number of logical and/or functional components (in addition to the normal components typically found in a mobile device, such as an antenna, microprocessor(s), memory device(s) and the like as explained above with reference to FIG. 1A). As shown, some of the components include a mobile application/browser 204, which may be provided by a payment card account processor entity, and an authenticator application programming interface (API) 206. As shown, the mobile application/browser 204 and the authenticator API 206 components are configured to operate in a rich execution environment (REE) 207. Also shown in FIG. 2 are a trusted authenticator application 208 and a trusted execution environment (TEE) biometric system 210, which are configured to operate in a trusted execution environment (TEE) 212.

The TEE 212 is a secure area that is separate from and/or partitioned from the REE 207, and that may reside, for example, in the main processor 122 of a consumer mobile device 102 (for example, see FIG. 1A). The TEE 212 ensures that sensitive data is stored, processed and protected in a trusted environment. In some embodiments, the TEE 212 is tamper-proof because the TEE includes a tampering evidence capability (for tamper-proofing), which is a desired security function for storing cardholder authentication credentials and/or payment credentials. The ability of the TEE to offer safe execution of authorized security software, which are sometimes referred to as "trusted applications," enables the TEE to provide end-to-end security by enforcing protection, confidentiality, integrity and data access rights.

Referring again to FIG. 2, the TEE biometric system 210 represents one or more biometric sensors 214 which run in the TEE, such as a fingerprint sensor and/or a microphone and/or a camera. The biometric sensors 214 may include sensor hardware and software applications, and may include one or more microprocessors operably connected to the sensor(s) and configured to securely process and/or handle and/or manage biometric data capture 216, biometric data matching 218, and biometric data storage 220 processes between one or more biometric samples taken from the user or cardholder and one or more biometric templates that have been stored therein.

As also mentioned above, in some embodiments a cardholder or user is required to participate in a consumer device registration and user authentication enrollment process before user authentication processing in accordance with one or more of the methods described herein can occur. In some implementations, such a registration process may include a user or cardholder operating his or her consumer mobile device to interact with one or more payment processing systems or networks (not shown), and to provide information and/or data to register his or her consumer device along with one or more forms of biometric data for authentication purposes. The user or consumer may utilize his or her consumer device to enroll or register, and respond to a consumer registration request challenge message from an entity (such as a payment processor server computer) prompting the user to provide biometric data for use in consumer or user authentication. With regard to the consumer mobile device configuration 202 shown in FIG. 2, the biometric data captured during the user enrollment process is stored in the storage portion 220 of the TEE biometric system 210 of the consumer device 202, and such biometric data may be encrypted.

In general, the enrollment process may be followed by a user or consumer to register a number of biometric data items, depending on the capabilities of the consumer device, and may also may include providing a consumer device identifier (ID) and/or a mobile directory number ("MDN") from the consumer's mobile device to, for example, a payment processing network server. In some embodiments, the biometric data (which may include, for example, one or more of user fingerprint biometric data, voice print data, facial data, and other types of biometric data such as pulse data and the like), the device ID, and the MDN are stored in a storage area in the TEE by the consumer mobile device so that this sensitive data may be retrieved and utilized as needed when performing user authentication processing.

Referring again to FIG. 2, during a transaction wherein user authentication is required, the issuer FI 104A, for example, may transmit a user authentication request to the mobile application/browser 204 operating in the rich execution environment (REE) to perform an on-behalf-of (OBO) biometric user authentication process. (It should be understood that another platform or other trusted calling party instead of the issuer FI 104A, such as the Token issuer 104B may make the user authentication request.) The particular OBO biometric user authentication process to use may be predetermined or pre-arranged by an entity, such as a payment processing network. The OBO biometric user authentication process serves to enhance and/or speed up transaction processing because the user authentication processing is handled by the consumer's mobile device instead of by, for example, a remote server associated with an issuer financial institution.

After receiving the OBO authentication request, the mobile application/browser 204 transmits a request to the exposed authenticator API 206 (also operating in the REE) to conduct a user authentication process, and the authenticator API first implements an access control mechanism to check if the mobile application is permitted to use the authenticator API. As mentioned above, in some implementations the authenticator API 206 is also an abstraction layer abstracting calling parties from the low level hardware features of the biometric sensor(s) making the development and interaction seamless. So if the mobile application is authorized, then the authenticator API 206 transmits the request to the TEE biometric system 210 (operating in the trusted execution environment or TEE 212) for biometric data capture and processing using one or more biometric sensors and other components to authenticate the user. In some implementations, the user is prompted (for example, by a message displayed on a display screen of the consumer's mobile device, such as a Smartphone) to provide one or more forms of biometric data by using the sensor(s) found on the consumer's mobile device.

For example, predetermined and stored business rules concerning user authentication for a purchase less than $50 may require a consumer or user to only provide one type or one form of biometric data (for example, face data by using an integrated camera if the consumer's mobile device). In this case, an integrated camera of the consumer's device captures 216 a photograph of the user's face (conventionally known as a "selfie"), and then one or more components of the TEE biometric system 210 (operating in the trusted execution environment) performs a matching process 218 and stores the biometric data in a storage area 220 of the TEE 212. The result of the authentication process is transmitted from the TEE biometric system 210 to the trusted authenticator application 208 running inside the TEE. For example, if a match occurs for the captured user biometric data (i.e., the photograph data matches a template stored in the biometric storage component of the TEE) then the trusted authenticator application 208 validates the trust by authenticating the biometric sensor, and then signs the authentication message before sending it to the mobile application/browser 204 via the authenticator API 206. The authenticator API 206 then transmits the authentication response via the mobile application/browser 204 back to the issuer FI 104A (or to whichever other trusted calling party made the authentication request). It should be understood that this secure, multi-factor authentication technique can be utilized in many different manners depending on the context and/or attributes of a particular transaction. For example, different criteria and/or business rules that govern which and/or how many different biometric sensors are to be utilized for a particular transaction may be utilized. Such criteria and/or business rules may be predetermined by a third party, such as an issuer financial institution and/or payment network.

Figure 3:
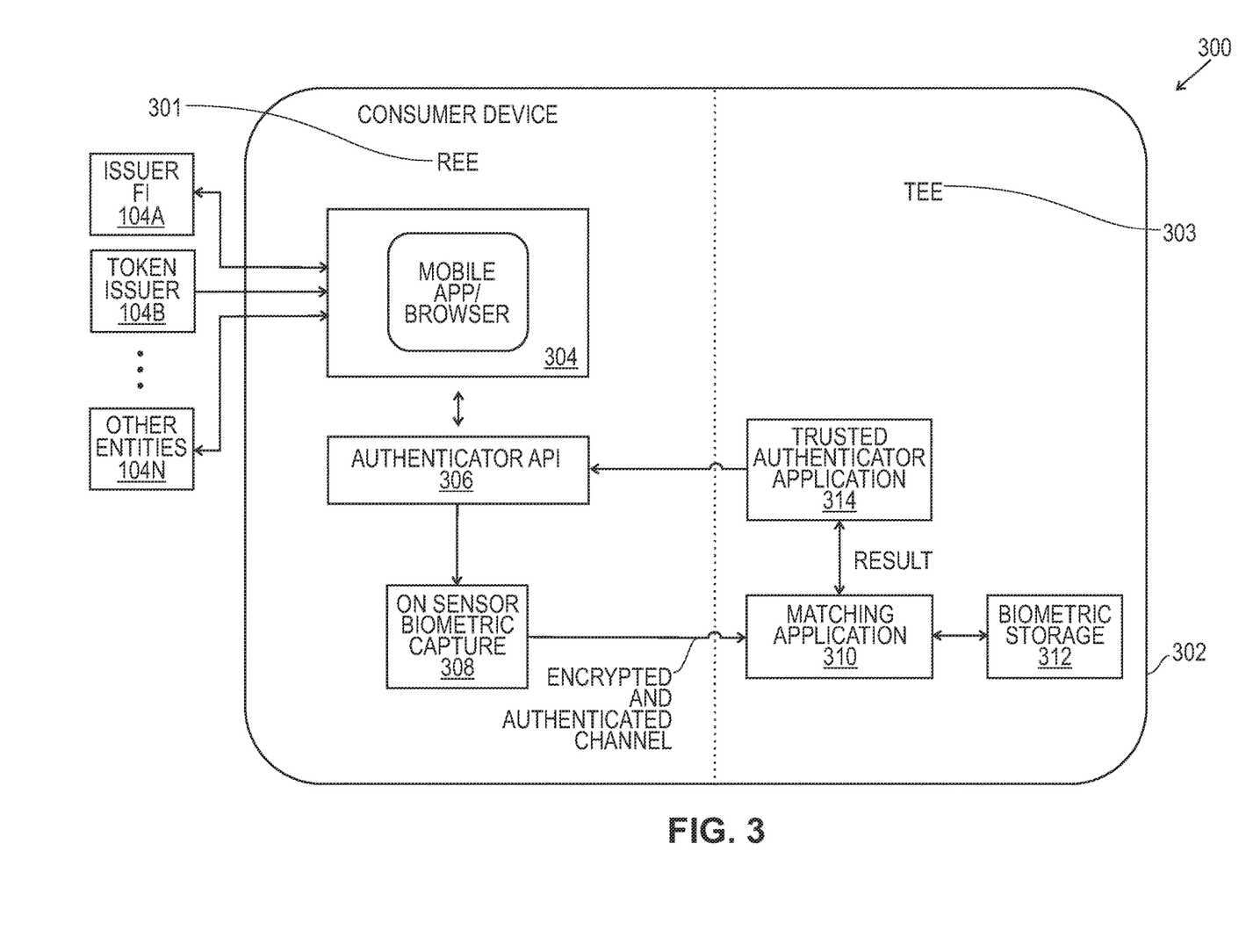
FIG. 3 is a block diagram of a portion of a transaction system for performing a secure user authentication process with a consumer mobile device according to yet another embodiment of the disclosure.

FIG. 3 is a block diagram of another embodiment of a portion of a transaction system 300 for performing a secure user authentication process. As mentioned above, described embodiments may involve a number of devices and/or components and/or entities which interact to conduct a user authentication process as part of a transaction, such as a payment transaction. Thus, a user or consumer may operate a consumer mobile device 302 to interact with an issuer financial institution (FI) computer 104A, which may be an issuer access control system (issuer ACS) computer, to conduct a user authentication process. Thus, while only a single consumer mobile device 302 is shown in FIG. 3 along with an issuer FI 104A, token issuer 104B, and an Other Entities computer 104N (each of which may be associated with a different entity or organization), in practice a large number of such consumer mobile devices and other components and/or devices may be involved in the overall system.

Referring to FIG. 3, the consumer device 302 includes a number of logical and/or functional components (which may be in addition to the normal software and hardware components typically found in a mobile device, such as an operating system, an antenna, microprocessor(s), memory device(s) and the like). As shown, some of the components include a mobile application/browser 304, which may be provided by a payment card account processor, an authenticator application programming interface (API) 306, and one or more biometric sensor(s) 308. The mobile application 304, biometric sensor(s) 308, and the authenticator API 306 components operate in a rich execution environment (REE) 310. Also shown in FIG. 3 are a matching application 310, a biometric storage portion 312, and a trusted authenticator application 314, which all operate in a trusted execution environment (TEE) 303. The biometric sensor 308 represents one or more biometric sensors, such as a fingerprint sensor and/or a microphone and/or a camera. In the configuration of FIG. 3, the biometric sensor(s) 308 may include sensor hardware and software applications, function to capture the user's biometric information and store that biometric data during a user registration or enrollment process, and operate to capture biometric data from a user during the user authentication process.

As explained above, some implementations require a consumer or user to conduct a user enrollment and device registration process before user authentication processing in accordance with the methods described herein can occur. In some implementations, the user or consumer operates his or her consumer mobile device to interact with one or more payment processing systems or networks (not shown) to provide information and/or data to register his or her consumer mobile device along with one or more forms of biometric data for authentication purposes. Thus, the user or consumer may utilize his or her consumer mobile device to enroll or register, and respond to a consumer registration request challenge message from an entity (such as a payment processor server computer) prompting the user to provide biometric data for use in user authentication. With regard to the consumer mobile device configuration shown in FIG. 3, the biometric data captured during the enrollment process is stored in the biometric storage portion 312 of the TEE of the consumer device, and such biometric data may be encrypted.

In general, the enrollment process may be followed by a user or consumer to register a number of biometric data items, depending on the capabilities of the consumer device, and may also may include providing a consumer device identifier (ID) and/or a mobile directory number ("MDN") from the consumer's mobile device to, for example, a payment processing network server. In some embodiments, the biometric data (which may include, for example, one or more of user fingerprint biometric data, a voice print, facial data, and other data such as pulse or the like), the device ID, and the MDN are stored in the biometric storage area 312 of the TEE by the consumer mobile device so that this data may be retrieved and utilized as needed when performing authentication processing.

Referring again to FIG. 3, during a transaction wherein user authentication is required, the issuer FI 104A, for example, may transmit a request to the mobile application 304 operating in the rich execution environment (REE) to perform an on-behalf-of (OBO) biometric authentication process. (As mentioned above, another platform or other trusted calling party instead of the issuer FI 104A may make the authentication request.) The particular OBO biometric user authentication process to use may be predetermined or pre-arranged by an entity, such as a payment processing network, and enhances and/or speeds up transaction processing as compared to conventional methods because the authentication processing is handled by the consumer's mobile device 302. After receiving the OBO authentication request, the mobile application/browser 304 transmits a request to the exposed authenticator API 306 (also operating in the REE) to conduct a user authentication process, and the authenticator API first implements an access control mechanism to check if the mobile application is permitted to use the authenticator API. If so, then the authenticator API 306 prompts a user (for example, by a message displayed on a display screen of the consumer's mobile device) to provide one or more forms of biometric data by using the biometric sensor(s) associated with the consumer's mobile device, and instructs the biometric sensor(s) 308 (operating in the REE) to capture user biometric data. The captured user biometric data is then securely transmitted by the biometric sensor(s) 308 to the matching application 310 which is running in the trusted execution environment (TEE). In some embodiments, the matching application 310 compares the captured biometric user data to one or more biometric templates that are associated with the user, and which are stored in the biometric storage portion 312 located within the TEE. If the result of the comparison is a match, then the matching application 310 validates the trust by confirming that the captured biometric user data came from recognized biometric sensor(s), signs the result, and then transmits the result of the matching process to the trusted authenticator application 314 running inside the TEE. The signed (verified) biometric match result(s) then are communicated back to the mobile application/browser 304 via the authenticator API 306 for transmission back to the issuer FI104A (or other trusted entity that requested user authentication).

It should be understood that, in some implementations, the mobile application/browser 304 only receives the result of the biometric authentication, and does not receive any of the cardholder's biometric data. The locally stored cardholder biometric user data thus never leaves the confines and/or the boundaries of the TEE 303. Thus, this secure, multi-factor authentication technique can be utilized in many different manners depending on the context and/or attributes of a particular transaction (for example, by employing different criteria and/or business rules that govern which and/or how many different biometric sensors are to be utilized for a particular type of transaction).

Figure 4:
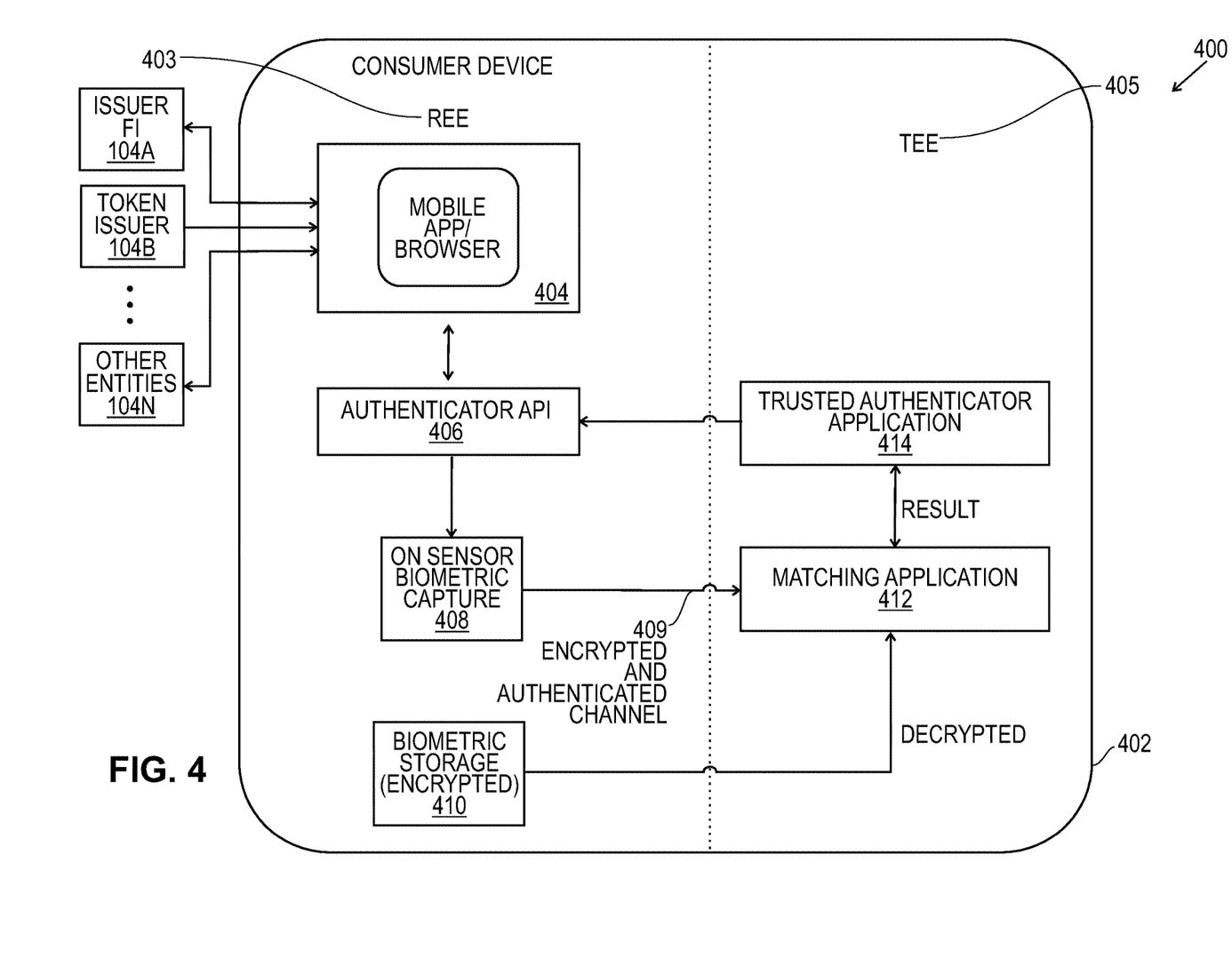
FIG. 4 is a block diagram of a portion of a transaction system for performing a secure user authentication process with a consumer mobile device according to a further embodiment of the disclosure.

FIG. 4 is a block diagram of a portion of a transaction system for performing a secure user authentication process according to yet another embodiment. This described embodiment may also involve a number of devices and/or components and/or entities which interact to conduct a user authentication process as part of a transaction, such as a payment transaction. Thus, a user or consumer may operate a consumer mobile device 402 to interact with an issuer financial institution (FI) computer 104A, which may be an issuer access control system (issuer ACS) computer, or other entity or platform to conduct a user authentication process as disclosed herein. Thus, while only a single consumer mobile device 402 is shown in FIG. 4 along with an issuer FI computer 104A, a token issuer computer 104B, and a plurality of Other Entity computers 104N (each of which may be associated with a different entity or organization), in practice a large number of such consumer devices and/or other components and/or devices may be involved in the overall system.

Referring to FIG. 4, the consumer mobile device 402 includes a number of logical and/or functional components (which may be in addition to the normal software and hardware components typically found in a user's mobile device, such as an operating system, an antenna, microprocessor(s), memory device(s) and the like as described hereinabove). As shown, some of the components include a mobile application/browser 404, which may be provided by a payment card account processor, an authenticator application programming interface (API) 406, one or more biometric sensor(s) 408, and a biometric storage area 410. The mobile application 404, biometric sensor(s) 408, biometric storage area 410, and the authenticator API 306 components operate in a rich execution environment (REE) 403. Also shown in FIG. 4 are a matching application 412 and a trusted authenticator application 414, which operate in a trusted execution environment (TEE) 405. The biometric sensor 408 represents one or more biometric sensors, such as a fingerprint sensor and/or a microphone and/or a camera. In the configuration shown in FIG. 4, the biometric sensor(s) may include sensor hardware and software applications, and operate to capture biometric data from a user during the user authentication process.

As explained above, implementations of the user authentication process require a consumer or user to enroll and to register his or her consumer device before user authentication processing in accordance with the methods described herein can occur. In some implementations, the user may operate his or her consumer mobile device to interact with one or more payment processing systems or other networks (not shown) to provide the information and/or data to register his or her consumer device along with one or more forms of biometric user data for user authentication purposes. Thus, during the registration process, the user or consumer may utilize his or her consumer mobile device to respond to a consumer registration request challenge message from an entity (such as a payment processor server computer) which prompts the user to provide biometric data for later use in a user authentication process. With regard to the consumer mobile device configuration shown in FIG. 4, the biometric data captured during the enrollment process is encrypted and then stored in the biometric storage portion 410 of the REE of the consumer mobile device.

In general, the enrollment process followed by a user or consumer can be used to provide a number of biometric data items associated with the user, which may depend on the capabilities of the consumer mobile device. The consumer may also be prompted by, for example, a payment processing network server to provide a consumer device identifier (ID) and/or a mobile directory number ("MDN") from the consumer's mobile device. In some embodiments, the user's biometric data (which may include, for example, one or more of user fingerprint biometric data, a voice print, facial data, and other data such as pulse or the like), the device ID, and the MDN may be encrypted and then stored in the biometric storage area 410 of the REE by the consumer mobile device so that this data may be retrieved and utilized as needed when performing authentication processing.

Referring again to FIG. 4, during a transaction wherein user authentication is required, the issuer FI computer 104A, for example, may transmit a request to the mobile application 404 operating in the rich execution environment (REE) to perform an on-behalf-of (OBO) biometric authentication process. (As mentioned above, another platform or other trusted calling party instead of the issuer FI computer 104A may make the authentication request.) The particular OBO biometric authentication process to use may be predetermined or pre-arranged by the entity making the authentication request, such as a payment processing network, and serves to enhance and/or speed up transaction processing as compared to conventional processes because the authentication processing is handled by the consumer's mobile device 402.

After receiving the OBO authentication request, the mobile application/browser 404 transmits a request to the exposed authenticator API 406 (also operating in the REE) to conduct a user authentication process, and the authenticator API 405 first implements an access control mechanism to check if the mobile application/browser 404 is permitted to use the authenticator API. When a determination is made that the mobile application/browser 404 is permitted to use the authenticator API 406, then the authenticator API 406 prompts a user (for example, by a message displayed on a display screen of the consumer's tablet computer) to provide one or more forms of biometric data by using one or more sensor(s) 408 of the consumer's mobile device, and instructs the biometric sensor(s) 408 (operating in the REE 403) to capture the biometric user data as the user provides such data using one or more biometric sensors. The captured biometric user data may then be encrypted and transmitted on a secure authenticated channel 409 by the biometric sensor(s) 408 to the matching application 412 which is running in the trusted execution environment (TEE) 405. In some embodiments, the matching application 412 decrypts the captured biometric user data and compares it to one or more biometric templates stored in the biometric storage portion 410 located within the REE 402 (in some implementations, the matching application 412 must first decrypt the biometric templates that are stored in the biometric storage area 410 before making one or more comparisons). If the result of the comparison is a match, then the matching application 412 validates the trust by confirming that the captured biometric user data came from recognized biometric sensor(s) 408, signs the result, and then transmits the result of the matching process to the trusted authenticator application 414 running inside the TEE 405. The signed (verified) biometric match result then is communicated back to the mobile application 404 via the authenticator API 406 for transmission back to the issuer ACS 104A (or other trusted entity that requested user authentication). Thus, this secure, multi-factor authentication technique can be utilized in many different manners depending on the context and/or attributes of a particular transaction (for example, by employing different criteria and/or business rules that govern which and/or how many different biometric sensors are to be utilized for a particular transaction).

Figure 5:
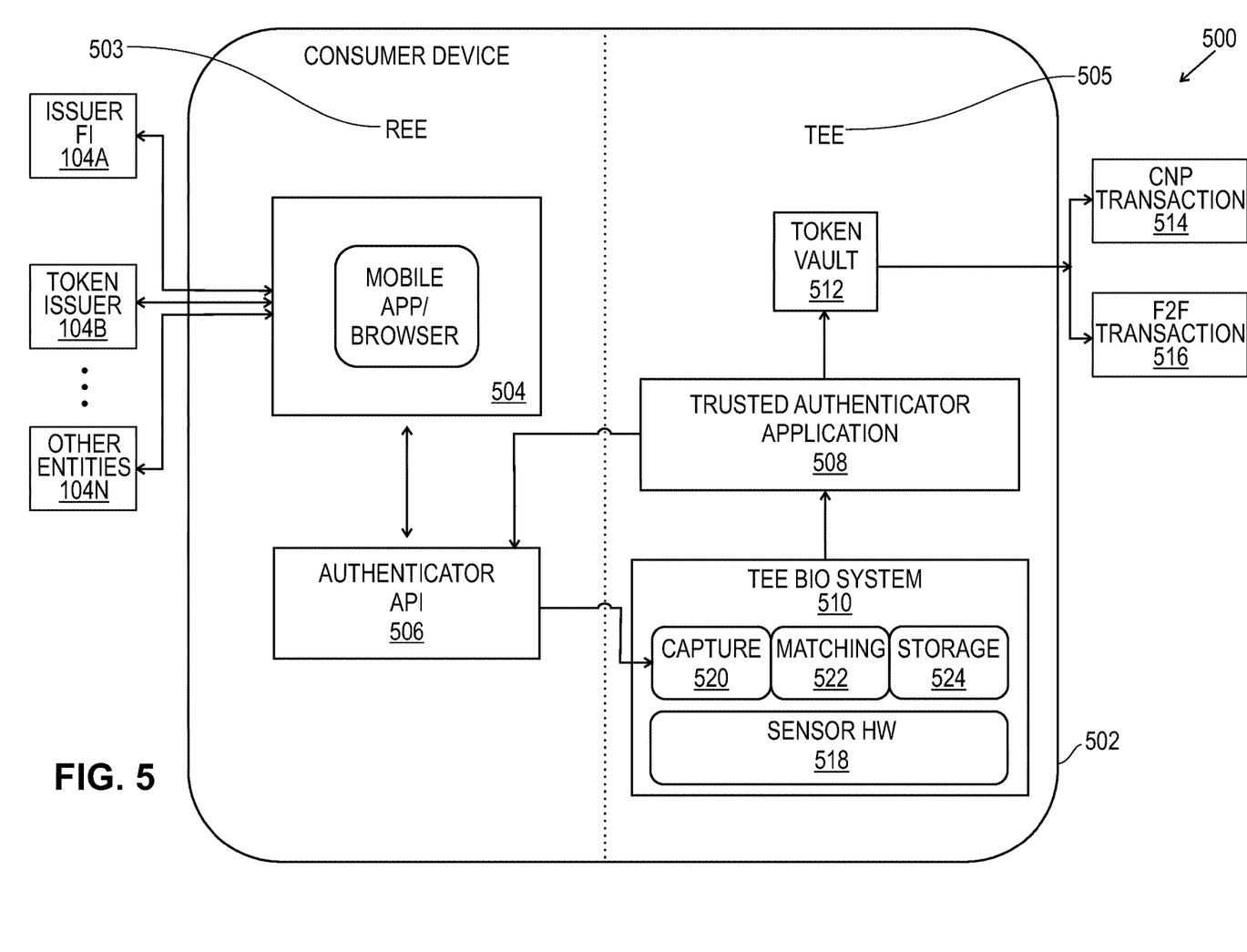
FIG. 5 is a block diagram of a portion of a transaction system for performing a secure user authentication process with a consumer mobile device according to yet another further embodiment of the disclosure.

FIG. 5 is a block diagram of a portion of a transaction system 500 for performing a secure user authentication process with a consumer mobile device 502 in the context of utilizing payment tokens for a transaction according to an embodiment. As mentioned above, it should be understood that a system pursuant to the described embodiments involves a number of devices and/or components and/or entities which interact to conduct a user authentication process as part of a transaction, such as a payment transaction. Thus, while only a single consumer mobile device 502 is shown in FIG. 5 along with an issuer FI computer 104A, token issuer 104B, and an Other Entities computers 104N (each of which may be associated with a different entity or organization), in practice a large number of such consumer mobile devices and other components and/or devices may be involved in a system in accordance with this disclosure.

Referring to FIG. 5, the consumer mobile device 502 includes a number of logical and/or functional components (in addition to the normal components typically found in a mobile device, such as an antenna, microprocessor(s), memory device(s) and the like). As shown, some of the components include a mobile application/browser 504, which may be provided by a payment card account processor, and an authenticator application programming interface (API) 506. The mobile application/browser 504 and the authenticator API 506 components are configured to operate in a rich execution environment (REE) 503. Also shown in FIG. 5 are a trusted authenticator application 508, a biometric system 510, and a token vault 512, which components are configured to operate in a trusted execution environment (TEE) 505. The TEE biometric system 510 represents one or more biometric sensors which run in the TEE 505, such as a fingerprint sensor and/or a microphone and/or a camera. The biometric sensors may include sensor hardware 518 and software applications, and may includes one or more microprocessors operably connected to the sensor(s) and configured to securely process and/or handle and/or manage biometric data capture 520, biometric data matching 522 between one or more biometric samples taken from the user or cardholder and one or more stored biometric templates, and biometric data storage 524. It should be noted that the token vault 512 is part of the consumer mobile device, in contrast to many conventional authentication systems that locate a token vault on a server computer of an entity, such as a third party authentication service provider.

As also mentioned hereinabove, in some embodiments a cardholder or user is required to participate in a consumer device registration and user authentication enrollment process before user authentication processing in accordance with one or more of the methods described herein can occur. In some implementations, such a registration process may include a user or cardholder operating his or her consumer mobile device to interact with one or more payment processing systems or networks (not shown), and to provide information and/or data to register his or her consumer device along with one or more forms of biometric data for authentication purposes. The user or consumer may utilize his or her consumer mobile device to enroll or register, and respond to a consumer registration request challenge message from an entity (such as a payment processor server computer) prompting the user to provide biometric user data for use in user authentication. With regard to the consumer mobile device configuration shown in FIG. 5, the biometric data captured during the enrollment process is stored in the storage area 524 of the TEE biometric system 510 in the TEE 505 of the consumer device, and such biometric data may be encrypted. In addition, the user or cardholder may interact with a token issuer 104B to obtain payment tokens which are stored in the token vault 512 of the TEE 505, wherein such payment tokens can be used during an on-line payment transaction (sometimes referred to as a "card not present" or CNP transaction 514) or during a "face-to-face" (F2F) payment transaction 516 which may occur, for example, at a point-of-sale (POS) terminal at a retail store.

It should be understood that each token stored in the token vault 512 of the TEE 505 is unique and confidential between merchants. The tokens in the token vault are also domain controlled, which means that a token associated with Merchant "A" can only be used for transactions with Merchant "A" and not for any transactions with any other merchant(s). In addition, in some embodiments each token may be associated with a different type of user authorization process. For example, a token associated with Merchant "B" may require the user of the consumer mobile device to provide fingerprint data, a personal identification number (PIN) and voice data for user authentication purposes. However, a token associated with Merchant "C" may require the user of the consumer mobile device to provide a personal identification number (PIN) and iris scan data for user authentication purposes.

The enrollment process may result in the user or cardholder registering a number of biometric data items, depending on the capabilities of the consumer mobile device, and may also may include providing a consumer device identifier (ID) and/or a mobile directory number ("MDN") from the consumer's mobile device to, for example, a payment processing network server. In some embodiments, the biometric data (which may include, for example, one or more of user fingerprint biometric data, a voice print, facial data, and other data such as pulse or the like), the device ID, and the MDN are stored in a storage area in the TEE 505 by the consumer mobile device so that this data may be retrieved and utilized as needed when performing authentication processing.

Referring again to FIG. 5, if the cardholder wishes to use payment tokens during a purchase transaction, then user authentication is required, and in some embodiments the user or cardholder may utilize the mobile application/browser 504 operating in the rich execution environment (REE) 503 to perform a biometric authentication process. The particular biometric authentication process to use may be predetermined or pre-arranged by an entity, such as the token issuer 104B, and serves to enhance and/or speed up transaction processing as compared to conventional authentication processes because the authentication processing is handled by the consumer's mobile device 502. After receiving the user authentication request, the mobile application/browser 504 transmits a request to the exposed authenticator API 506 (also operating in the REE) to conduct a user authentication process, and the authenticator API first implements an access control mechanism to check if the mobile application is permitted (or has permission or authorization) to use the authenticator API. If the mobile application is authorized, then the authenticator API 506 transmits the request to the TEE biometric system 510 (operating in the TEE 505) for biometric data capture and processing using one or more biometric sensors and other components to authenticate the user. In some implementations, the user is prompted (for example, by a message displayed on a display screen of the consumer's mobile device) to provide one or more forms of biometric data by using the sensor(s) found on the consumer's mobile device 502. Next, one or more components of the TEE biometric system 510 (operating in the TEE 505) performs a matching process and the result of the authentication process is transmitted from the TEE biometric system 510 to the trusted authenticator application 508 running inside the TEE 505. If a match occurred for the captured user biometric data and the stored biometric user data, then the trusted authenticator application 508 validates the trust by authenticating the biometric sensor, and then may sign the authentication message and send it to the mobile application/browser 504 via the authenticator API 506. The trusted authenticator application 508 also instructs the token vault 512 to release one or more payment tokens to satisfy payment for a CNP transaction 514 and/or for a F2F transaction 514. The authenticator API 506 may also transmit the authentication response, for example, to the token issuer 104B.

It is contemplated that such user authentication processing in concert with a token vault could be utilized with the consumer mobile device configurations shown in FIGS. 3 and 4, and with other consumer mobile device configurations having a TEE. It also should be understood that this secure, multi-factor authentication technique can be utilized in many different manners in a token payments context (for example, by employing different criteria and/or business rules that govern which and/or how many different biometric sensors are to be utilized for a particular transaction).

Therefore, in accordance with the secure user authentication processes described herein, hardware and/or software components of a consumer mobile device perform a number of operations, functions or services such as, for example, a user or cardholder authentication biometric data registration method, a biometric assurance method, a biometric authentication method, and an attestation service. The consumer mobile device may also be configured to provide services and/or components (hardware and/or software) providing support for different biometric authentication protocols or techniques, such as voice print technology, fingerprint technology, face print technology, iris (eye) biometric technology, and the like. Different authenticator type frameworks may also be provided to provide support for different authenticator types. For example, frameworks may be provided for fingerprint, voice, face, pulse or other biometric authentication techniques. Frameworks may also be provided for different mobile device types (for example, different mobile phone makes and models, which may run different types of operating systems, and/or the like) as well as for different hardware and software components. The consumer mobile device may also be configured to provide data and components associated with different assurance frameworks which may include a policy manager, analytics, scoring, and assurance token data storage. Such frameworks and components allow a wide variety of consumer mobile devices to provide secure user authentication processing as well as providing access to a wide variety of authentication users to interact to provide a different security levels for authentication that may be used for a wide variety of different transactions.

With regard to the consumer mobile device configurations of FIGS. 1A and 2 to 4, once the user has been authenticated, an authentication confirmation may be returned to the issuer financial institution (FI) or issuer access control service (ACS) that allows a payment transaction to be completed. In addition, the embodiments described herein allow such biometric user authentication to be used in conjunction with a wide variety of different transactions. Further, business rules and/or other criteria may define what type of authentication is to be used in a given transaction with a given consumer mobile device. The result is a system and method that provides multi-factor authentication for use with consumer mobile devices in order to conduct transactions (or to provide other services, such as entry to a building and/or entry to a mass transit system and/or the like) and that includes a wide variety of authentication techniques.

The above descriptions and illustrations of processes herein should not be considered to imply a fixed order for performing the process steps. Rather, the process steps may be performed in any order that is practicable, including simultaneous performance of at least some steps.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A secure on mobile device user authentication method, comprising:
    receiving, by a mobile application running on a mobile device processor operating in a rich execution environment (REE) of a consumer mobile device, an on-behalf-of (OBO) user authentication request from an entity during a transaction, the OBO user authentication request comprising authentication criteria required by the entity;
    transmitting, by the mobile application running on the mobile device processor via an authenticator application programming interface (API) operating in the REE to at least one biometric sensor of the mobile device operating in a trusted execution environment (TEE), a biometric data capture request in accordance with the authentication criteria;
    determining, by the authenticator API via an access control mechanism running on the mobile device processor, that the mobile application is authorized to utilize the authenticator API;
    prompting, by the mobile device processor, the user of the consumer mobile device to provide at least one form of biometric data to the at least one biometric sensor in accordance with predetermined business rules of the entity;
    determining, by the mobile device processor, that the at least one form of biometric data provided by the user matches locally stored biometric data;
    receiving, by a trusted authenticator application running on the mobile device processor and operating in the TEE, a user authentication response;
    validating, by the trusted authenticator application operating in the TEE, the user authentication response by authenticating the at least one biometric sensor;
    signing, by the trusted authenticator application, the validated user authentication response;
    transmitting, by the trusted authenticator application to the authenticator API operating in the REE, the signed and validated user authentication response;
    receiving, by the mobile application from the authenticator API, the signed and validated user authentication response; and
    transmitting, by the mobile application to the entity, the signed and validated user authentication response message.

2. The method of claim 1, further comprising, subsequent to prompting the user to provide at least one form of biometric data:
    capturing, by the at least one biometric sensor of the mobile device, biometric data provided by the user of the consumer mobile device;
    comparing, by the at least one biometric sensor of the mobile device, the captured biometric data of the user to predetermined biometric data stored on the at least one biometric sensor of the consumer mobile device;
    determining, by the at least one biometric sensor, that the captured biometric data matches the stored biometric data; and
    transmitting, by the at least one biometric sensor of the mobile device to the authenticator API, an indication that a match occurred.

3. The method of claim 1, wherein the authentication criteria comprises obtaining at least two different forms of biometric data from the user utilizing at least two different biometric sensors.

4. The method of claim 1, wherein the authentication criteria is based on a type of transaction being conducted by the user.

5. The method of claim 1, wherein the entity comprises one of an access control server, an issuer financial institution computer, and a payment network.

6. The method of claim 1, wherein the at least one biometric sensor operates in the REE of the consumer mobile device, and further comprising, prior to receiving the signed and validated user authentication response:
    transmitting, by the at least one biometric sensor to a matching application operating in the trusted execution environment (TEE) of the consumer mobile device, captured biometric data of the user of the consumer mobile device;
    comparing, by the matching application, the captured biometric user data to at least one biometric template associated with the user that is stored in a biometric storage portion of the TEE;
    determining, by the matching application, that the captured biometric user data matches the at least one biometric template;
    transmitting, by the matching application to a trusted authenticator application operating in the TEE, a user authentication response;
    validating, by the trusted authenticator application operating in the TEE, the user authentication response from the at least on biometric sensor by authenticating the biometric sensor;
    signing, by the trusted authenticator application, the validated user authentication response; and
    transmitting, by the trusted authenticator application, the signed and validated user authentication response to the authenticator API operating in the REE of the consumer mobile device.

7. The method of claim 1, wherein the at least one biometric sensor and a biometric storage portion operate in a rich execution environment (REE) of the consumer mobile device, and wherein the biometric storage portion stores encrypted user biometric templates, and further comprising, prior to receiving the user authentication response:
    capturing and encrypting, by the at least one biometric sensor, biometric data provided by the user of the consumer mobile device;
    transmitting, by the at least one biometric sensor to a matching application operating in a trusted execution environment (TEE) of the consumer mobile device, the captured and encrypted biometric data of the user;
    decrypting, by the matching application, the captured and encrypted biometric data of the user;
    obtaining, by the matching application, at least one encrypted biometric template associated with the user that is stored in the biometric storage portion of the REE;
    decrypting, by the matching application, the at least one encrypted biometric template;
    comparing, by the matching application, the captured and decrypted biometric user data to the decrypted at least one biometric template;
    transmitting, by the matching application to a trusted authenticator application operating in the TEE, a user authentication response when the captured and decrypted biometric user data matches the decrypted at least one biometric template;

validating, by the trusted authenticator application operating in the TEE, the user authentication response from the at least on biometric sensor by authenticating the biometric sensor;

signing, by the trusted authenticator application, the validated user authentication response; and transmitting, by the trusted authenticator application, the validated and signed user authentication response to the authenticator API operating in the REE of the consumer mobile device.

8. The method of claim 7, wherein transmitting the captured biometric user data further comprises utilizing a secure authenticated channel between the at least one biometric sensor and the matching application operating in the TEE.

9. The method of claim 1, wherein the entity is a token issuer and the at least one biometric sensor operates in a trusted execution environment (TEE) of the consumer mobile device, and further comprising, prior to receiving the user authentication response:

validating, by a trusted authenticator application operating in the TEE, the user authentication response from the at least on biometric sensor by authenticating the biometric sensor;

signing, by the trusted authenticator application, the validated user authentication response;

instructing, by the trusted authenticator application, a token vault to release at least one payment token to satisfy payment for a transaction; and transmitting, by the trusted authenticator application, the signed user authentication response to the mobile application via the authenticator API operating in the REE of the consumer mobile device.

10. The method of claim 9, further comprising instructing, by the trusted authenticator application, the token vault operating in the TEE to release at least one payment tokens to satisfy payment for one of a card not present (CNP) transaction or for a face-to-face (F2F) transaction.

11. The method of claim 9, further comprising transmitting, by the authenticator API via the mobile application, the user authentication response to the token issuer.

12. A transaction system comprising:
at least one issuer financial institution (FI) computer;
a plurality of entity computers; and
a consumer mobile device configured for communicating with the at least one issuer FI computer and the plurality of entity computers and for providing a secure on mobile device user authentication method comprising:
a mobile device processor;
at least one storage device;
receive and transmit circuitry; and
at least one biometric sensor;
wherein the consumer mobile device further comprises a mobile application, an authenticator application programming interface (API), an access control mechanism operating in a rich execution environment (REE), and a trusted authenticator application operating in a trusted execution environment (TEE) running on the mobile device processor;
and wherein the at least one storage device comprises instructions configured to cause the mobile device processor to:
receive an on-behalf-of (OBO) user authentication request from an entity during a transaction via the mobile application, the OBO user authentication request comprising authentication criteria required by the entity;
transmit a biometric data capture request, via the authenticator application programming interface (API) to the at least one biometric sensor in accordance with the authentication criteria;
determine, by the authenticator API via the access control mechanism, that the mobile application is authorized to utilize the authenticator API;
prompt the user of the consumer mobile device to provide at least one form of biometric data to the at least one biometric sensor in accordance with predetermined business rules of the entity;
determine that the at least one form of biometric data provided by the user matches locally stored biometric data;
receive, by the trusted authenticator application, a user authentication response;
validate, by the trusted authenticator application, the user authentication response by authenticating the at least one biometric sensor;
sign, by the trusted authenticator application, the validated user authentication response;
transmit, by the trusted authenticator application to the authenticator API, the signed and validated user authentication response;
receive, via the authenticator API, the signed and validated user authentication response;
and
transmit the signed and validated user authentication response message to the entity.

13. The system of claim 12, further comprising at least one token issuer computer configured to communicate with the consumer mobile device.

* * * * *